United States Patent [19]

Shimizu

[11] Patent Number: 4,895,393

[45] Date of Patent: Jan. 23, 1990

[54] CLOCK-STUDYING PICTURE BOOK

[75] Inventor: Yuichi Shimizu, Kokubunji, Japan

[73] Assignee: Dainippon Kaiga Co., Ltd., Tokyo, Japan

[21] Appl. No.: 272,051

[22] Filed: Nov. 14, 1988

[30] Foreign Application Priority Data

Nov. 25, 1987 [JP] Japan ............................ 62-179031[U]

[51] Int. Cl.⁴ .................... B42D 3/14; B42D 3/12; G04C 21/16; G04B 21/00
[52] U.S. Cl. ..................................... 281/15.1; 281/30; 368/245; 368/272
[58] Field of Search .......................... 281/15 R, 30, 31; 368/1, 164; 364/705.02, 705.03, 705.4; 200/35 R; 446/147; 70/272; 116/236, 237, 239

[56] References Cited

U.S. PATENT DOCUMENTS

| 693,647 | 2/1902 | Hirschfield | 368/253 |
|---|---|---|---|
| 1,521,600 | 1/1925 | Crowe | 200/35 R |
| 1,743,512 | 1/1930 | Aisen | 281/30 |
| 4,060,973 | 12/1977 | Martino | 368/245 |
| 4,523,858 | 6/1985 | Nishimura et al. | 368/272 |

FOREIGN PATENT DOCUMENTS

| 0186930 | 9/1986 | European Pat. Off. | 446/147 |
|---|---|---|---|
| 52-46851 | 4/1977 | Japan | 368/253 |
| 323237 | 8/1957 | Switzerland | 70/272 |

Primary Examiner—Douglas D. Watts
Assistant Examiner—Paul M. Heyrana, Sr.
Attorney, Agent, or Firm—Wenderoth, Lind & Ponack

[57] ABSTRACT

In a clock-studying picture book, a picture book body illustrating respective picture patterns relating to various times of day is provided with a sound generator which, when a long hand or short hand, or both the long and short hands are controlled to point to a specific time, generates a sound making the specific time recognizable, so that the infant can study the clock and time while enjoying himself during play.

5 Claims, 3 Drawing Sheets

CLOCK-STUDYING PICTURE BOOK

BACKGROUND OF THE INVENTION

1. Field of the Invention

The present invention relates to a picture book with which an infant can study how to tell time from a clock while enjoying the pictures. The picture book will hereinafter be called a clock-studying picture book.

2. Description of the Prior Art

There have heretofore been produced and used various picture books and clock toys for the purpose of letting infants study a clock and time while they are playing. However, in the case of a picture book, interest of the infant is attracted toward picture patterns drawn there, and it cannot be said that a satisfactory effect has been achieved in the respect of the study of the clock and time. Furthermore, in the case of a clock toy, control of the clock hands is simple and is monotonous because the time is visually recognized, whereby the interest of the infant is not retained, so that the infant is soon tired of playing with the clock toy. As viewed from the standpoint of the study of the clock by the infant, it cannot be said that a satisfactory effect has been achieved similarly to the case of the aforesaid picture book.

Therefore, in order to retain the interest of an infant as much as possible and to enhance the effect of study of the clock, there has been developed an invention which is obtained by the combination of a picture book with a clock toy (for example, Japanese Utility Model Laid-Open Gazette No. 21600/1986).

However, the aforesaid invention obtained by the combination of a picture book with a clock toy may be regarded as the one in which the conventional picture book and clock toy are merely combined together. The problem, from which the conventional picture book and clock toy suffer, still remain. As viewed from the standpoint of the study of the clock by an infant, the problem is presented that it cannot be said that a satisfactory effect is achieved.

SUMMARY OF THE INVENTION

The present invention has been developed to obviate the above-described disadvantages of the prior art and has as its object the provision of a clock-studying picture book for the purpose of letting an infant effectively study the clock and time while enjoying the pictures.

To achieve the above-described object, the present invention contemplates that a picture book body illustrating respective picture patterns relating to desirable times is provided with a sound generator which, when a long hand or short hand, or both the long and short hands are controlled to point to a specific time, generates a sound making the specific time recognizable.

According to the present invention, an infant is made to recognize a specific time and a life environment at this time by a picture pattern illustrated in a picture book, made to recognize a positional relationship between the time and a hand or hands by the control of the hand or hands of a clock provided on the picture book body, and, at the same time, a sound making the time recognizable is generated, whereby the infant is made to recognize the time through hearing the sound, so that this sound facilitates the recognition of the time by the infant, and moreover, interest is felt by the infant in handling the clock, thereby enabling the infant to study the clock while playing.

DETAILED DESCRIPTION OF THE PREFERRED EMBODIMENTS

Figure 1:
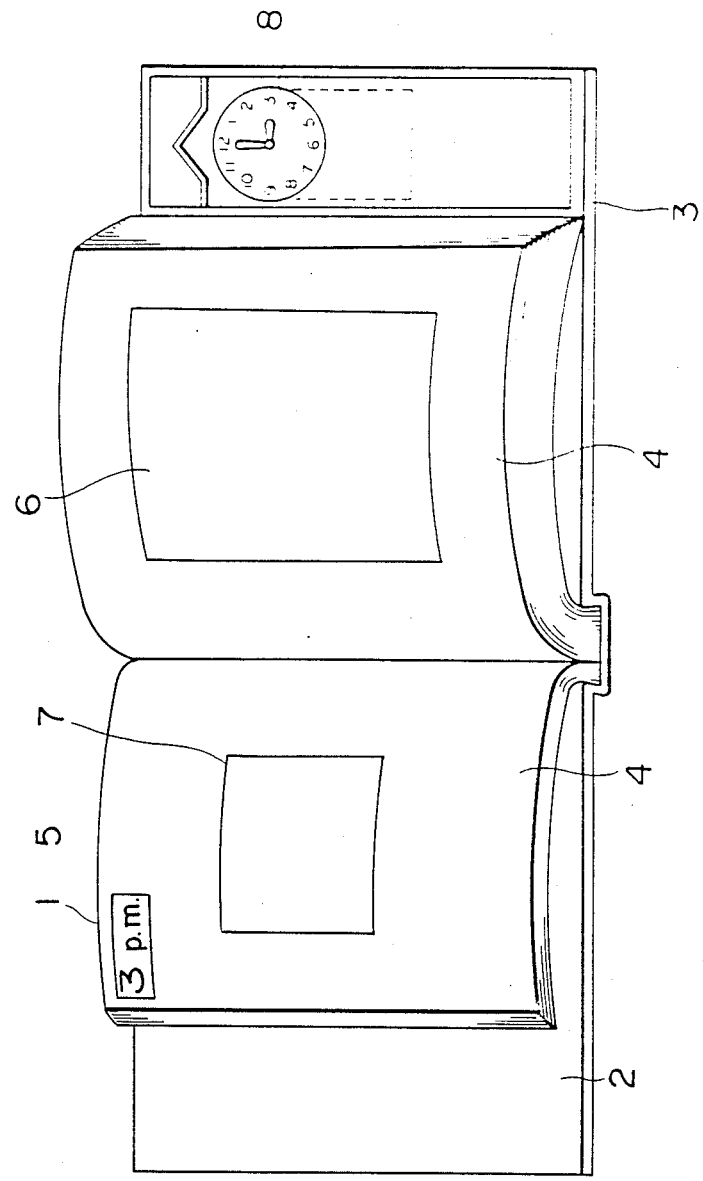
FIG. 1 is a perspective view showing one embodiment of the present invention.
Figure 2:
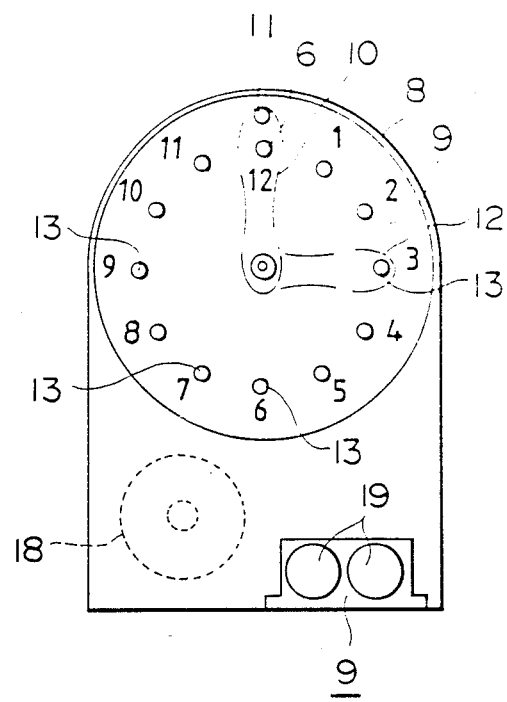
FIG. 2 is an enlarged front view of the clock shown in FIG. 1 with the long and short hands omitted.
Figure 3:
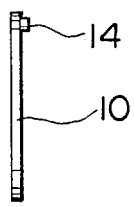
FIG. 3 is a side view of the long hand.
Figure 4:
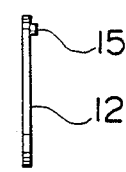
FIG. 4 is a side view of the short hand.
Figure 5:
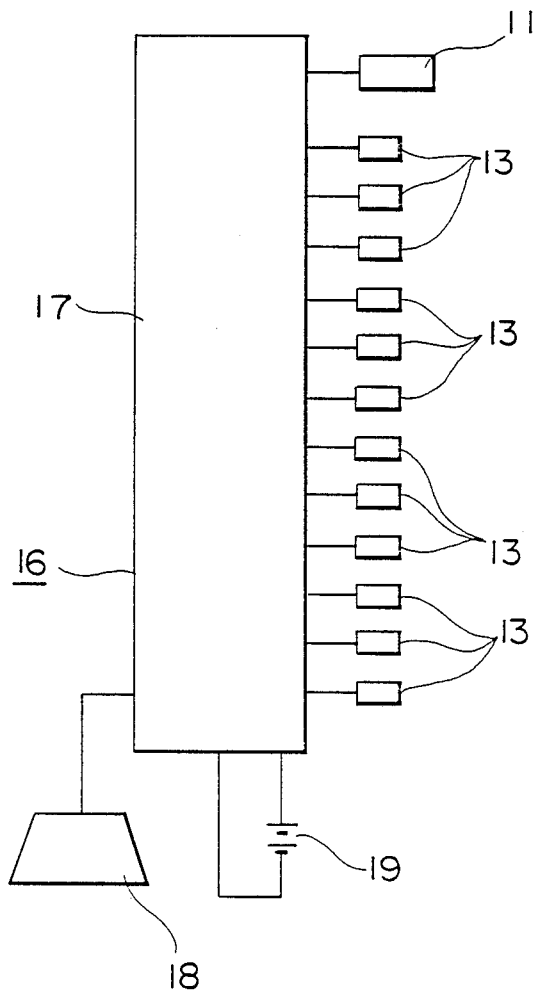
FIG. 5 shows an electric circuit of of the sound generator.

The present invention will be described in detail with reference to the accompanying drawings. However, the present invention is not limited to the single disclosed embodiment.

Referring to the drawings, designated by numeral 1 is a picture body body, in which a front cover 2 and a back cover 3 are longer than each of paper pages 4 in the opening direction of the book. On one of the paper pages 4 there is shown an indication of a specific time of day 5 and a picture pattern 6 of the life environment relating to the time displayed in the specific time of day 5, and on the other of the paper pages 4, there are schematically shown sentences 7 including a brief description of the time and the picture pattern 6 and words of a song. As described above, in the picture book body 1, a plurality of paper pages 4 displaying picture patterns 6, sentences 7 and the like are bound. On the respective paper pages 4, 4, . . . , the time of day indications 5 and the picture patterns 6, which are different from one another, are displayed. The times which are displayed in the time of day indications 5 of the plurality of paper pages 4, 4, . . . , are not limited in particular. However, the times of day may be displayed in conformity with the life environment of the infants such for example as 8 a.m., 10 a.m., mid-day, 3 p.m., 5 p.m., and 8 p.m. In the embodiment, in displaying the time of day iindications 5, the picture patterns 6 and the sentences 7 on the paper pages 4, mainly, the time of day indications 5 and the sentences 7 are displayed on the left-hand page and, mainly, the picture pattern 6 is displayed on the right-hand page.

Denoted at numeral 8 is a toy clock provided on the picture book body 1. This clock 8 is provided on a portion projecting from the paper page 4 inside the back cover 3 of the picture book body 1, whereby the clock 8 is not concealed by the paper pages 4 and can be seen no matter what to what page the book is opened. Designated at numeral 9 is a face of the clock, on which time indicating indicia for the times from one (1) to twelve (12) o'clock are displayed. On the face 9 of the clock, at a position corresponding to a position at which 12 o'clock is displayed, among the time displays, a clock face mounted switch actuator 11 associated with a manipulable time indicating means in the form of a long hand 10, which is on-operated by being pressed by a switch pressing member on the long hand 10, and off-operated when released, is provided. The outer end of a short hand 12 cannot reach the position where the switch actuator 11 associated with the long hand 10 is provided.

Similarly, on the face 9 of the clock, at the positions corresponding to the time displays from one to twelve o'clock, clock face mounted switch actuators 13 associated with the short hand 12, which are on-operated by being pressed by a switch pressing member on the short hand 12, are provided. Provided at the outer end of the rear surface, i.e., a surface opposed to the face 9 of the clock, of the long hand 10 is a raised switch pressing member 14 for pressing the switch actuator 11 associated with the long hand 10, and, provided at the outer end of the rear surface, i.e. a surface opposed to the face 9 of the clock, of the short hand 12 is a raised switch pressing member 15 for pressing the switch actuators 13 associated with the short hand 12. The switch actuator 11 associated with the long hand 10 and the switch actuator 13 associated with the short hand 12 are for switches which form a part of an arrangement of an electric circuit of a sound generator to be described hereinafter. Denoted at numeral 16 is a sound generator provided on the clock 8. This sound generator 16 is arranged such that when any one of the switches corresponding to actuators 13 and associated with the short hand 12 is pressed by pressing member 15 for being turned on in a state when the switch actuator 11 associated with the long hand 10 is on, in response to a signal from the switch associated with actuator 13 associated with the short hand 12, which has been selected, a sound making the infant recognize the time corresponding to the selected switch actuator 13 associated with the short hand 12 is generated. More specifically, in order for the sound generator 16 to generate a sound, it is necessary that the "on" condition of the switch for actuator 11 associated with the long hand 10 and the "on" condition of a switch for an actuator 13 associated with the short hand 12 be coincident with each other, and the sound is continuously generated for a predetermining time by means of a timer. Any sound may be adopted as the sound generated by this sound generator 16 so long as the sound can make the infant recognize the time displayed at the position where the switch actuator 13 associated with the short hand 12 is provided. For example, the sound may be a time signal or a melody indicating a specific time, or a melody may be generated after a time signal. Furthermore, a melody or words relating to the picture pattern 6 or words of a song displayed on the paper page 4 of the picture book body 1 displaying the time may be produced. Denoted at numeral 17 is an integrated circuit for generating the sound in response to a signal from the selected switch for actuators 13 associated with the short hand 12, numeral 18 designates a speaker and numeral 19 designates an electric power source. In this embodiment, at all of the positions of the time displays from one to twelve o'clock, the switches corresponding to actuators 13 associated with the short hand 12, which are on-operated by being pressed by the pressing portion on the short hand 12, are provided, respectively. However, the switch actuators 13 associated with the short hand 12 need not necessarily be provided at all of the positions of the time displays. For example, the switch actuators 13 associated with the short hand 12 can be provided only at positions corresponding to the times of the time displays 5 displayed on the respective paper pages 4, 4, ... of the picture book body 1, and others may be dispensed with.

Incidentally, the clock need not necessarily be limited to the clock 8 shown in the above embodiment, and any clock may be adopted as long as it has the sound generator for generating the sound indicating the specific time when, at least, the long hand or short hand, or both the long and short hands, are controlled to point to the specific time.

As has been described hereinabove, in the clock-studying picture book according to the present invention, the picture book body illustrating respective picture patterns relating to desirable times is provided with the sound generator which, when the long hand or short hand, or both the long and short hands, are controlled to point to a specific time, generates a sound making the specific time recognizable, so that the infant can recognize the life environment corresponding to the time and understand the idea of time by looking at the picture patterns drawn in the picture book. Then, the infant can control the hand or hands of the clock provided on the picture book body to learn the positional relationship between the time and the hands. When the long and short hands point to the specific time simultaneously, the sound making the specific time recognizable is generated, whereby the infant can listen to this sound to recognize the specific time through the hearing sense, so that the understanding of the idea of time is facilitated, thus offering the advantages that the sound facilitates the recognition of the time by the infant, and moreover, interest is felt by the infant in handling the clock, which enables the infant to study the clock while playing.

I claim:
1. A clock studying picture book, comprising:
   a stack of a plurality of book pages at least some of which have thereon an indication of a time of day and at least one related picture;
   a clock means operatively associated with said book pages and having time indicating indicia and a manipulable time indicating means manipulate to correspond with selected ones of the time indicating indicia to indicate various times of day corresponding to the times of day on said at least some of said book pages;
   a switch means associated with at least some of said time indicating indicia and actuable by said time indicating means when said time indicating means correspond with the time indicating indicia to indicate a time of day; and
   circuit means to which said switch means are connected and having a sound generating means and means for causing said sound generating means to emit a distinctive sound for each of the respective time indicia having a switch means associated therewith when said switch means is actuated by a time indicating means positioned in correspondence therewith.

2. A clock studying picture book as claimed in claim 1 further comprising a cover means having a cover on which said stack of pages is supported and having a portion extending past the edges of said pages in said stack, and said clock means is mounted on said portion extending past the edges of said pages.

3. A clock studying picture book as claimed in claim 1 in which said clock has a face, and said time indicating indicia are hour indicating means spaced at twelve equal intervals in a closed geometric figure on said face, and said time indicating means are a long hand and a short hand movable over said face to point to combinations of said hour indicating means for indicating various hours during the day.

4. A clock studying picture book as claimed in claim 3 in which one of said time indicating indicia is for indicating the hour twelve and the remaining indica are for indicating the hours one to eleven, respectively, and said one time indicating indicia has a first switch and a second switch associated therewith, and said long hand has a switch actuating means which, when said long hand is in a position corresponding to said one time indicating indicia, is operably associable with said first switch for causing said first switch to be in the on condition, and said short hand has a further switch actuating means which, when said short hand is in a position corresponding to said one time indicating indicia, is operably associable with said second for causing said second switch to be in the on condition, and said switch means for the remainder of said time indicating indicia are in positions for being operably associable with the switch actuating means on said short hand when said short hand is in a position corresponding to the respective ones of the remainder of the time indicating indicia, and said means for causing said sound generating means to issue a sound comprises means for causing said sound generating means to issue a distinctive sound in response to the placing of said first switch in the on condition and the respective placing of the second switch and the switch means for the remainder of said time indicating indicia in the on condition.

5. A clock studying picture book as claimed in claim 4 in which said switches are switches having switch actuators which place the switches in the on condition by being pressed, and in the off condition by being released, and said switch actuating means are pressing members for pressing said switch actuators.

* * * * *